April 17, 1951     W. E. WITHALL     2,549,036
FRICTION SHOCK ABSORBER FOR RAILWAY CAR TRUCKS
Filed April 27, 1949     2 Sheets—Sheet 1
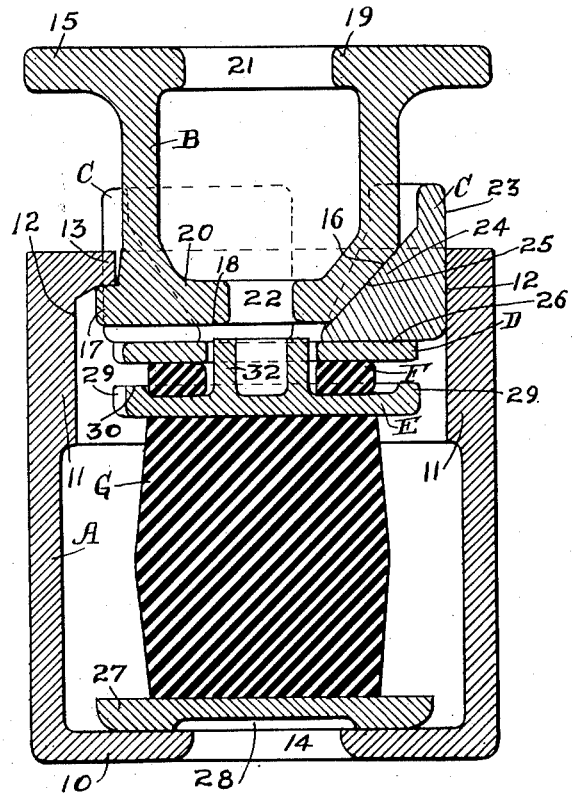
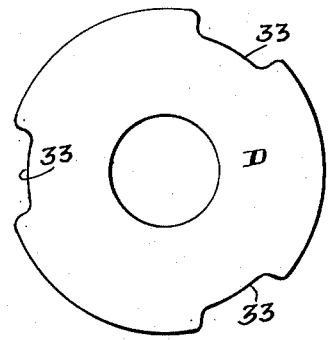
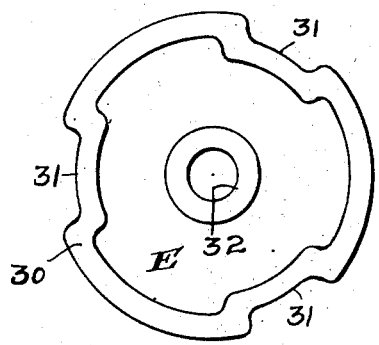
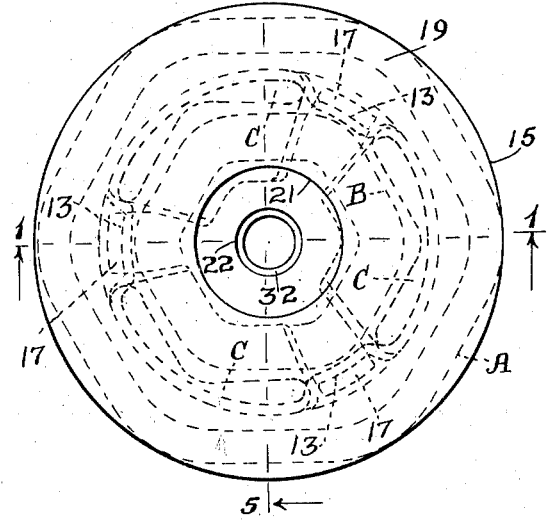
Inventor:
William E. Withall.
By Henry Fuchs.
Atty.

April 17, 1951  W. E. WITHALL  2,549,036
FRICTION SHOCK ABSORBER FOR RAILWAY CAR TRUCKS
Filed April 27, 1949  2 Sheets-Sheet 2
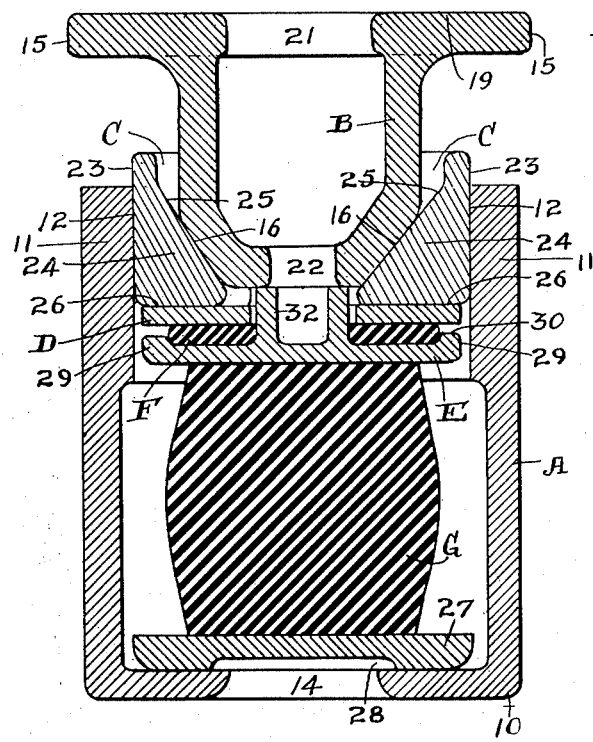
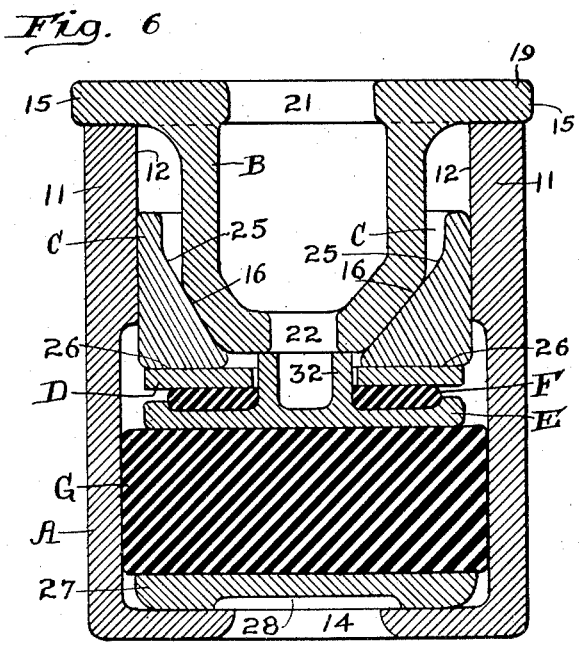
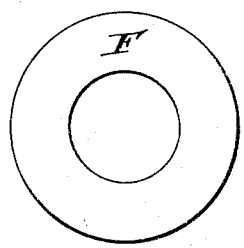
Inventor:
William E. Withall.
By Henry Fuchs.
Atty Patented Apr. 17, 1951

2,549,036

UNITED STATES PATENT OFFICE 2,549,036

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application April 27, 1949, Serial No. 89,965

6 Claims. (Cl. 267—9)

This invention relates to improvements in friction shock absorbers especially adapted for use in connection with railway car truck springs for snubbing or dampening the vertical action of the same.

One object of the invention is to provide a friction shock absorber for dampening or snubbing the action of truck springs of railway cars, including a casing, friction members, and a rubber cushioning element, wherein the rubber cushioning element is particularly designed to be directly compressed by the pressure transmitting means of the device to produce the required shock absorbing capacity to effectively dampen or snub the action of the truck springs when subjected to the heavier shocks encountered in service, without any danger of overloading and bursting the friction shell section of the casing structure.

Another object of the invention is to provide a simple and efficient friction means for snubbing or dampening the action of truck springs of railway cars, wherein the frictional resistance produced is substantially constant throughout the major portion of the compression stroke of the device.

A further object of the invention is to provide a friction shock absorbing mechanism of the character indicated, comprising a friction casing, friction shoes slidingly telescoped within the casing, a wedge pressure transmitting member in wedging engagement with the shoes, and cushioning means within the casing opposing inward movement of the wedge and shoes, wherein means is provided acting independently of said cushioning means for yieldingly pressing the shoes against the wedge to set up the wedging action and force the shoes against the friction surfaces of the casing.

Another object of the invention is to provide a friction shock absorber, comprising a friction casing, a plurality of friction shoes slidingly telescoped within the casing, a pressure transmitting wedge block in wedging engagement with the shoes, a follower normally spaced from the wedge block, a rubber cushioning element reacting between said follower and the shoes to press the latter against the wedge member, said follower being engageable by the wedge after a predetermined amount of compression of the mechanism to force the follower inwardly of the casing, and cushioning means within the casing yieldingly opposing inward movement of said follower.

Yet another object of the invention is to provide a friction shock absorber, comprising a friction casing, a plurality of friction shoes slidable within the casing, a rubber cushioning element within the casing yieldingly opposing inward movement of the shoes and wedge, and a second rubber element for pressing the shoes into wedging engagement with the wedge, wherein means is provided, operative after a predetermined amount of compression of the mechanism, for directly transmitting inward movement from the wedge to said second named rubber cushioning element independently of the shoes, thereby limiting the spreading action of the shoes and thus relieving the casing from bursting strains.

Still another object of the invention is to provide a friction shock absorber, comprising a friction casing, a friction clutch including friction shoes slidingly telescoped within the casing, a wedge pressure transmitting member in wedging engagement with the shoes, a follower movable inwardly of the casing with the wedge member, and yielding means reacting between said follower and shoes to force the latter against the wedge, and additional yielding means within the casing opposing inward movement of said follower, wherein the follower and the wedge member are in the form of separate units to provide for flexibility and thus prevent binding or sticking of the friction clutch of the device.

Other objects of the invention will more clearly appear from the description and claims hereinafter following.

In the accompanying drawings forming a part of this specification, Figure 1 is a vertical sectional view of my improved friction shock absorber, said section corresponding substantially to the line 1—1 of Figure 2. Figure 2 is a top plan view of Figure 1. Figure 3 is a top plan view of the follower ring shown in Figure 1. Figure 4 is a top plan view of the follower disc shown in Figure 1. Figure 5 is a vertical sectional view, corresponding substantially to the line 5—5 of Figure 2, showing the shock absorber partly compressed. Figure 6 is a view similar to Figure 5, showing the mechanism fully compressed. Figure 7 is a top plan view of the rubber ring shown in Figure 1.

As shown in the drawings, my improved shock absorber comprises broadly a friction casing A, a wedge B, three friction shoes C—C—C, a follower ring D bearing on the shoes, a follower disc E, a rubber cushioning ring F between the follower ring and disc, and a rubber block G opposing movement of the follower disc E inwardly of the casing.

The friction casing A is in the form of a tubular member of substantially hexagonal, transverse cross section. The casing A is open at the upper end and has a transverse bottom wall 10 at its lower end. At the open upper end thereof, the walls of the casing are inwardly thickened to provide a friction shell section 11. The friction shell section 11 presents three longitudinally extending, interior friction surfaces 12—12—12 of V-shaped, tranverse cross section, parallel to the central longitudinal axis of the casing. At the open upper end, the casing A is provided with three interior stop lugs 13—13—13, which are alternated with the three friction surfaces 12—12—12. The bottom wall 10 of the casing is provided with a central opening 14 therethrough, adapted to accommodate the usual spring centering projection of the bottom spring plate of a cluster of truck springs of a railway car.

The wedge B is in the form of a hollow block, having a laterally outwardly projecting, annular flange 15 at its outer end. At its inner end, the block is provided with three wedge faces 16—16—16 of V-shaped, transverse cross section, arranged symmetrically about the longitudinal central axis of the wedge. The three faces 16 converge inwardly or downwardly of the mechanism. At the inner or lower ends of the wedge faces 16—16—16, the wedge B has three laterally outwardly projecting, radial lugs 17—17—17 which are alternated with the wedge faces, as clearly shown in Figure 2. In other words, the lugs 17—17—17 are arranged so that they are located between adjacent wedge faces and extend between adjacent shoes C—C to engage in back of the lugs 13 of the casing and restrict outward movement of the wedge. The wedge has a flat, transverse, lower end face 18, which cooperates with the follower disc E, as hereinafter pointed out. The top and bottom walls 19 and 20 of the wedge B are provided with concentric openings 21 and 22 extending therethrough, which serve to accommodate a holding tool employed in assembling the mechanism, as hereinafter described. As shown in Figure 1, the opening 21 is made of larger diameter than the opening 22 so as to accommodate the usual spring centering projection of the top spring plate of a truck spring cluster.

The three friction shoes C—C—C are of similar design, each shoe having an outer, longitudinally extending, V-shaped friction surface 23 engaged with one of the V-shaped friction surfaces 12 of the casing A. On its inner side, each shoe is provided with an enlargement 24, presenting a V-shaped wedge face 25, engaged with one of the wedge faces 16 of the wedge B, and correspondingly inclined thereto. At its inner or bottom end, each shoe C presents a transversely extending, flat abutment face 26 on which the follower ring D is adapted to bear.

The rubber block G is in the form of an elongated solid cylinder, slightly tapered toward its opposite ends, as shown in Figure 1. The block G is arranged within the casing A below the friction shoes C—C—C, being supported on a disc-like plate 27, which is, in turn, supported on the bottom end wall 10 of the casing and closes the opening 14 of said wall. The disc-like plate 27 is centrally recessed on its bottom side, as indicated at 28, to provide clearance for the spring centering projection on the bottom spring plate of the cluster of truck springs. As shown in Figure 1, the block G projects upwardly beyond the inner ends of the friction surfaces 12 of the casing and supports the follower disc E.

The follower disc E is in the form of a relatively heavy, circular plate of greater diameter than the normal diameter of the cylindrical block G, as seen in Figure 1. The disc E has a peripheral, upstanding, annular flange 29 at its upper end, presenting a flat, transverse edge face 30. As shown in Figure 4, the disc E is notched at three circumferentially spaced points, as indicated at 31, to clear the lugs 13 of the casing in assembling the mechanism, and the flange 29 is correspondingly inwardly offset, as shown. A central, upstanding, hollow boss 32, which is open at its upper end, is provided on the top side of the disc E and is adapted to be engaged by the wedge B to transmit the actuating force directly to the rubber block G, the boss being located so as to be engaged by the flat bottom face 18 of the wedge.

The follower ring D is in the form of a flat metal washer of an outside diameter equal to the diameter of the disc E. The ring D is also notched at intervals, as indicated at 33—33—33, to clear the lugs 13—13—13 of the casing in assembling the mechanism. The ring D surrounds the boss 32 of the disc E and bears directly on the flat inner end face 26 of the shoes C.

The rubber ring F is in the form of a flat, washer-like member of an outside diameter to fit between the inset portion of the flange 29 of the disc E. The ring F is interposed between the follower ring D and the follower disc E, and maintains the ring D and disc E separated to an extent to hold the flange 29 spaced from the ring D. As shown in Figure 1, which illustrates the normal position of the parts of the shock absorber, these parts are so proportioned and designed that the boss of the disc E is spaced from the bottom end of the wedge B, and the clearance between this boss and the wedge is considerably less than the clearance between the top edge of the flange 29 of the disc E and the ring D.

In assembling the mechanism, the rubber block G is first placed within the casing A in position resting on the plate 27. The follower disc E, follower ring D, and the interposed rubber ring F are next placed on top of the block G. The three shoes C—C—C are then placed in position resting on the ring D. Next, the wedge B is placed on top of the shoes and turned so that the lugs 17—17—17 are circumferentially offset with respect to the lugs 13—13—13 of the casing so as to clear the latter when the wedge is moved inwardly of the casing. With the parts thus positioned, the follower disc E is depressed by a suitable tool, such as a bar, inserted through the openings 21 and 22 of the wedge B, to such an extent that the upper ends of the shoes C—C—C reach a position below the lugs 13—13—13 of the casing which will provide sufficient clearance for the rotary displacement of the lugs 17—17—17 of the wedge B. With the parts held in this position, the wedge B, which has been lowered with the shoes, is given a partial rotation to bring the lugs 17—17—17 in back of the lugs 13—13—13 of the casing in aligned position with the last named lugs. When the parts have been brought to this position, the disc E is freed from pressure by withdrawal of the assembling tool or bar, and expansion of the rubber block G forces the shoes to their upper or outermost position, thereby locking the wedge against rotation and forcing the lugs 17—17—17 of the latter against the lugs 13—13—13 of the casing A.

In the assembled condition of the mechanism, the rubber ring F and the rubber block G are preferably under a predetermined amount of initial compression, thus wedging the shoes against the block B.

My improved shock absorber preferably replaces one or more of the spring units of a truck spring cluster, being interposed between the top and bottom spring plates of said cluster.

The operation of my improved shock absorber is as follows: Upon the spring cluster of the truck of a railway car being compressed between the spring follower plates of the cluster, the wedge B is forced downwardly with respect to the casing A, spreading the shoes C—C—C apart and carrying the same inwardly of the casing against the resistance of the rubber ring F and the rubber block G. During the first part of the compression stroke, the frictional resistance gradually increases due to the compression of the rubber ring F and the rubber block G until the clearance between the inner end of the wedge B and the boss 32 of the follower disc E has been taken up, whereupon the pressure is transmitted directly from the wedge B, through the follower disc E, to the rubber block G, thereby preventing further compression of the rubber ring F, as illustrated in Figure 5, with the result that the frictional resistance remains constant during the entire remaining compression stroke of the mechanism, the only increase in resistance to movement of the parts being produced by the compression of the rubber block G by the wedge B. Compression of the shock absorber is finally limited, as illustrated in Figure 6, by engagement of the flange 15 of the wedge B with the upper end of the casing A, thus protecting the rubber block G against over-compression.

As my improved shock absorber is actuated, the frictional resistance produced, together with the shock absorbing capacity provided by the rubber elements, effectively snubs the action of the truck springs, the mechanism being operative to snub the action of the springs during both compression and recoil of the same.

As will be evident, my improved shock absorber is particularly designed to provide the required shock absorbing capacity to effectively dampen or snub the action of the truck springs when subjected to the heavier shocks encountered in service, without any danger of overloading and bursting the friction shell section of the casing structure, the rubber cushioning block being subjected to direct compression lengthwise of the casing by the wedge pressure transmitting member to take these heavier loads, and providing, when compressed to a point near the solid state as the shock absorber is being compressed to an extent approaching the maximum stroke of the same, resistance to movement of a magnitude well beyond that required. Further, my improved shock absorber also properly takes care of snubbing the action of the truck springs during the numerous lighter shocks to which they are subjected in service, by the progressively increasing frictional resistance afforded during relative movement of the wedge B and the follower disc E, and compression of the rubber ring F, and by the constant frictional resistance afforded by the clutch after the wedge comes into engagement with the follower disc E, and the added progressively increasing resistance provided by direct compression of the rubber block G by the wedge B. By limiting compression of the rubber ring F, the maximum amount of wedging action produced between the wedge and shoes is accurately controlled, regardless of the extent to which the rubber block G is compressed, thereby keeping the outward pressure exerted by the clutch well within the required limits to protect the casing against bursting.

As will be further evident, by forming the follower, which is movable with the wedge and which cooperates with the rubber ring for yieldingly pressing the shoes against the wedge, as a member which is separate from the wedge, a flexible clutch structure is provided which eliminates any tendency of the clutch to stick or jam, due to the application of eccentric forces to the wedge caused in service by angular or lateral relative displacement of the top and bottom spring plates of the cluster of truck springs.

I claim:

1. In a friction shock absorber, the combination with a friction casing; of a series of friction shoes slidingly telescoped within the casing; a pressure transmitting block in wedging engagement with the shoes; a follower within said casing rearwardly of the shoes, said follower having a forwardly projecting portion engageable by said block to effect movement of said follower inwardly of the casing with said block; a yielding element reacting between shoes and block; and a second yielding element within the casing opposing movement of said follower inwardly of the casing.

2. In a friction shock absorber, the combination with a friction casing; of a set of friction shoes slidingly telescoped within the casing; a pressure transmitting wedge block in wedging engagement with the shoes; a follower within said casing rearwardly of the shoes, said follower having a forward projection thereon engageable by the block to effect movement of said follower inwardly of the casing with said block, said projection of said follower being normally spaced from the inner end of said block; compressible yielding means reacting between said follower and shoes, the compression of said yielding means being limited by engagement of the block with said forward projection after a predetermined amount of compression of the mechanism; and additional yielding means within the casing opposing inward movement of said follower.

3. In a friction shock absorber, the combination with a friction casing; of a set of friction shoes slidingly telescoped within the casing; a pressure transmitting wedge in wedging engagement with the shoes; a follower within the casing rearwardly of the shoes, said follower having a portion thereof engageable by said wedge to effect movement of said follower inwardly of the casing with said wedge; a yielding element interposed between said follower and the rear ends of the shoes and reacting between said follower and shoes; and a second yielding element within the casing opposing inward movement of said follower, said last named element bearing at its front end on said follower.

4. In a friction shock absorber, the combination with a friction casing; of a set of friction shoes slidingly telescoped within the casing; a pressure transmitting wedge in wedging engagement with the shoes; a follower within the casing rearwardly of the shoes, said follower having a portion thereof normally spaced from said wedge and engageable by said wedge after the device has been compressed to a predetermined extent to effect movement of said follower inwardly of the casing with said wedge; a yielding element interposed between said follower and the rear ends of the shoes and reacting between said follower and shoes; and a second yielding element within the casing opposing inward movement of said follower, said last named element bearing at its front end on said follower.

5. In a friction shock absorber, the combination with a friction casing; of a series of friction shoes slidingly telescoped within the casing; a pressure transmitting block in wedging engagement with the shoes; a follower within said casing rearwardly of the shoes, said follower having a forwardly projecting portion engageable by said block to effect movement of said follower inwardly of the casing with said block; a yielding rubber element reacting between said shoes and block; and a second yielding rubber element within the casing opposing movement of said follower inwardly of the casing.

6. In a friction shock absorber, the combination with a friction casing; of a set of friction shoes slidingly telescoped within the casing; a pressure transmitting wedge in wedging engagement with the shoes; a follower within the casing rearwardly of the shoes, said follower having a portion thereof engageable by said wedge to effect movement of said follower inwardly of the casing with said wedge; a yielding rubber element interposed between said follower and the rear ends of the shoes and reacting between said follower and shoes; and a second yielding rubber element within the casing opposing inward movement of said follower, said last named element bearing at its front end on said follower.

WILLIAM E. WITHALL.

REFERENCES CITED

The following references are of record in the file of this patent:

UNITED STATES PATENTS

| Number | Name | Date |
| --- | --- | --- |
| 1,433,294 | O'Connor | Oct. 24, 1922 |
| 1,575,711 | O'Connor | Mar. 9, 1926 |
| 1,616,757 | O'Connor | Feb. 8, 1927 |
| 2,366,201 | Lehman | Jan. 2, 1945 |